United States Patent [19]

Rajamannan

[11] Patent Number: 5,575,111

[45] Date of Patent: Nov. 19, 1996

[54] METHOD OF USING HOT AIR FOAM TO KILL VEGETATION AND PESTS

[76] Inventor: A. H. J. Rajamannan, 2120 Argonne Dr., NE., Minneapolis, Minn. 55402

[21] Appl. No.: 535,545

[22] Filed: Sep. 28, 1995

[51] Int. Cl.[6] .................................................. A01M 21/00
[52] U.S. Cl. .................................. 47/58; 47/1.5; 47/1.44; 47/2; 43/138; 43/144
[58] Field of Search .......................... 43/138, 141, 132.1, 43/144; 47/1.01, 58, 1 B, 2, 1.5, 1.44, 58

[56] References Cited

U.S. PATENT DOCUMENTS

| | | | |
|---|---|---|---|
| 3,563,461 | 7/1968 | Cole | 47/2 CCB |
| 3,713,404 | 1/1973 | Lavo | 47/2 |
| 5,215,786 | 6/1993 | Kittle | 47/2 CCB |
| 5,319,878 | 6/1994 | Moffett | 43/132.1 |
| 5,433,758 | 7/1995 | Thompson | 47/58 |

Primary Examiner—Henry E. Raduazo
Attorney, Agent, or Firm—Herman H. Bains

[57] ABSTRACT

A method for destroying plants by superheating air, compressing it and using it to melt the plant's waxy cuticular coating while utilizing foam made in the process as an insulating agent. The melting of the waxy layer causes dehydration and death to the plant. The foam has a temperature close to the boiling point of water and surfactant combination. This requires that not only the water but also the compressed air be heated above the boiling point of water to achieve a foam whose temperature is approximately 212° F.

4 Claims, 1 Drawing Sheet

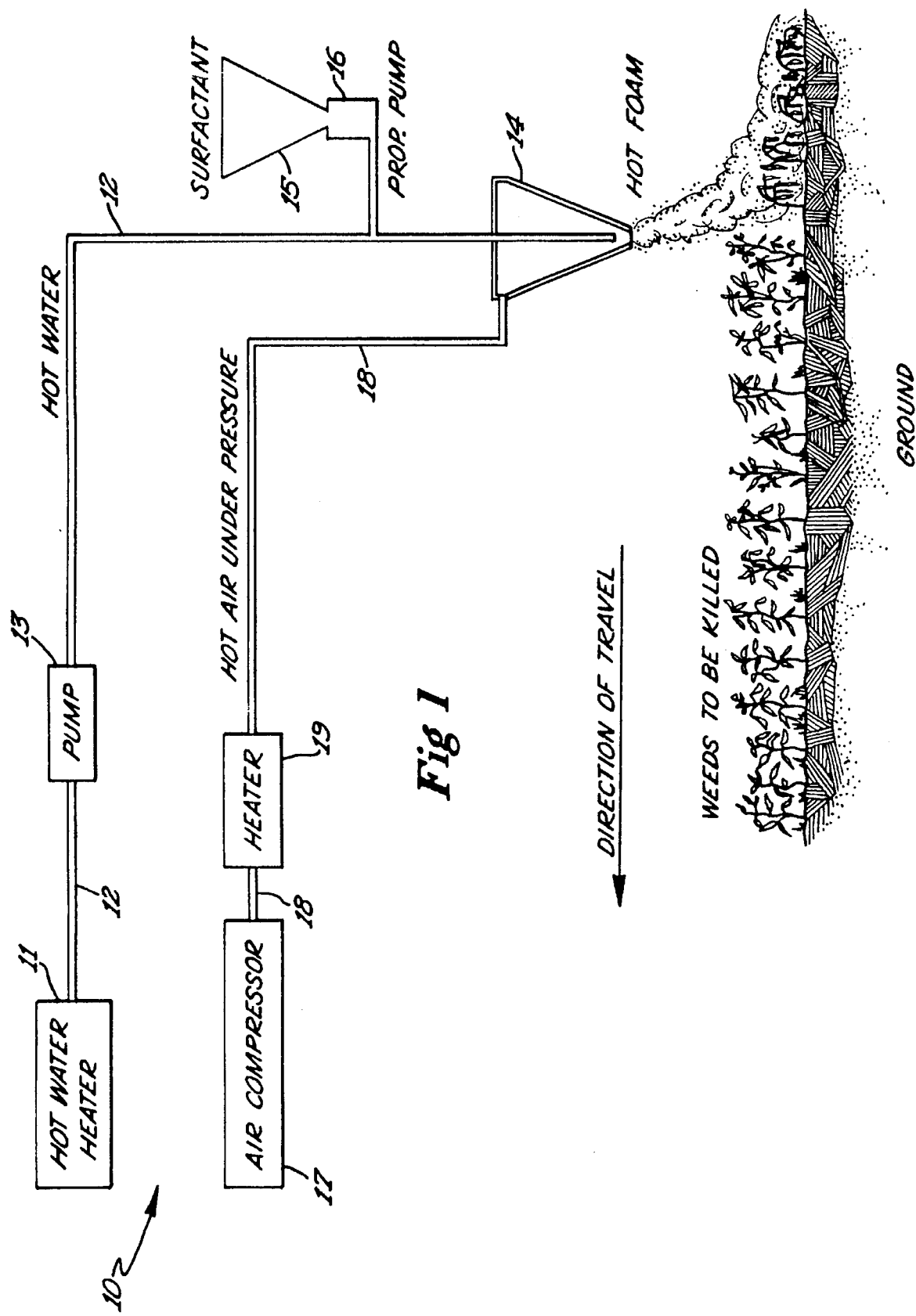

METHOD OF USING HOT AIR FOAM TO KILL VEGETATION AND PESTS

FIELD OF THE INVENTION

This invention relates to a method for treating the soil for killing weeds, fungus, bacteria, virus or insects or inhibits the activity thereof.

BACKGROUND OF THE INVENTION AND PRIOR ART

U.S. Pat. No. 5,297,730 was issued to Thompson and Rajamannan for killing weeds using hot water and particularly disclosed spraying hot water and using a blanket or apron to serve as a temporary insulation from the ambient temperature.

U.S. Pat. No. 5,433,758 was subsequently issued to Thompson and Rajamannan as an improvement. It discloses using heated water to kill vegetation in combination with the use of a foam blanket, instead of a fixed canopy to insulate the vegetation for a second or more from ambient temperatures.

U.S. Pat. No. 5,215,786 to Kittle uses foam as a form of insulation to protect plant matter in times of frost. Kittle also discloses heating this material to aid its cause. Our invention differs in that the foam will be heated to a degree that will kill the vegetation. We are not trying to protect weeds, but rather kill them.

U.S. Pat. No. 3,713,404 to Lavo et al describes a foam to which they add fertilizers, herbicides, fungicides, insecticides, sterilant, grass seed and mixtures thereof. Here they are entraining different materials in the foam and using the foam as a carrier of these specific materials.

U.S. Pat. No. 5,319,878 to Moffet et al describes a method to kill fire ants below the ground with a heated gel forming constituent. He is not using heated gel to kill weeds.

U.S. Pat. No. 3,563,461 to Cole Jr. describes a foam distribution system that is permanently fixed in the ground close to crops to protect them from insects. In addition, this system can be used to feed fertilizer and if necessary, act as an insulator against frost. He does not claim that this system kills unwanted vegetation. No where in this patent has Cole stated that he wanted to kill the trees and plants. Had Cole raised the temperature of the foam to boiling point, he would have melted the cuticular wax of the leaf and dehydrated the plant to death. His system also differs from our invention in that Cole's is not mobile.

U.S. Pat. No. 3,669,898 to Butler is saving the plant by using foam as in insulation device. He also does not wish to kill the plant.

SUMMARY OF THE INVENTION

An object of this invention is to economically, and with minimal environmental effects, kill unwanted plants (weeds) with a heated air and surfactant-based foam. Vegetation that is treated with hot liquids will die as a result of the heated liquid melting the plant's protective wax coating. However, the temperature surrounding the vegetation must be maintained for a period of time for the process to be effective.

Applicants, in an earlier application, disclose using a canopy to trail behind the heated water nozzle, which is dispensing the hot water on the weeds. The temperatures dropped below the critical temperature too soon if the canopy was too short, necessitating longer canopies. These longer canopies are unwieldy and impractical in many situations.

In a copending application, foam insulation dropped the temperatures on the leaf too quickly because (the foam-making process being an endothermic process) the foam produced was colder than the previously heated vegetation.

An object of this invention is to reduce the heat and water requirements, but still use heat to melt the waxy cuticular surface of a plant in an economical manner.

BRIEF DESCRIPTIONS OF THE DRAWINGS

FIG. 1 is a diagrammatic view of the apparatus used for carrying out the novel method.

DESCRIPTION OF THE PREFERRED EMBODIMENT

The method developed in this invention is to superheat air, compress it and use it to melt the plant's waxy cuticular coating while utilizing the foam made in the process as an insulating agent. The melting of the waxy layer causes dehydration and death to the plant. The key to this process being effective is producing a foam whose temperature is close to the boiling point of the water and surfactant combination. This requires that not only the water but also the compressed air be heated above the boiling point of water to achieve a foam whose temperature is approximately 212° F. The hot air volumetrically could be 80% or 95% and water/surfactant combination could be 5% to 20% of the finished foam. It is this high volume of hot air that will carry the calories needed to melt the waxy cuticle. This mobile apparatus can travel at varying speeds over the weeds or above the ground where weeds that needed to be killed are growing. Applicant's invention is a method to apply simultaneously both hot air and a medium of insulation to the vegetation, in the form of a foam, so that the heated vegetation will not cool down rapidly.

The apparatus consists of a mobile unit with a nozzle or nozzles through which a hot foam, consisting of heated water, heated compressed air and a foaming agent such as emulsified oils, surfactants, or polymers, will be sprayed directly on the target weeds to be killed.

When the heated air in the form of foam reaches the target weeds/vegetation, it will stick to the target and give "intimate heat contact" with the vegetation to be killed. It is this contact, with said heated air in the form of hot foam, that kills weeds, vegetation, fungus, and insects. The need to keep the foam insulation on target without breaking down can vary from one second to several hours, depending on the type and density of the vegetation.

This process of killing weeds will also simultaneously kill insects, fungus and other undesirable pests harbouring within the weeds. In other words, this hot air foam becomes the main killing agent instead of the hot water alone method as provided by our earlier invention.

In FIG. 1 of the drawing, it will be seen that one embodiment of the novel apparatus, designated generally by reference numeral 10, for carrying out the novel method is diagrammatically illustrated. The apparatus 10 includes a hot water boiler 11 which is connected by a conduit 12 to a discharge nozzle or nozzles 14. A pump connected in communicating relation to the conduit 14 downstream of the hot water boiler for supplying hot water under pressure to the nozzle 14. A surfactant container 15 having a proportioning pump 16 is also connected in communicating relation to the conduit 12. Thus a predetermined amount of surfactant will be provided during operation of the apparatus.

The apparatus also includes an air compressor 17 which is connected in communicating relation to a conduit 18 for supplying air under pressure to the nozzle 14. A heater 19 is disposed in communicating relation to the conduit 18 to permit the air under pressure to be heated before it is supplied to the nozzle or nozzles 14.

As pointed out above, the hot water boiler raises the temperature of the water to 212° F. while the heater 19 also raises the temperature of the air under pressure supplied to the nozzle or nozzles 14. The surfactant supplied to the hot water conduit 12, functions as a foaming agent which results in the discharge of hot foam from the discharge nozzle 14 or a plurality of such nozzles 14 upon the surface of the ground for killing various types of pests including weeds, vegetation, fungus and insects. The direction of travel of the vehicle is indicated by the arrow in FIG. 1 and the apparatus continuously provides hot foam to the surface of the ground for treating and killing pests.

From the foregoing, it will be seen that the apparatus permits the novel method of applying hot foam to the surface of the ground in an efficient way to kill various agricultural pests.

What is claimed is:

1. A method of forming and applying heated air foam to vegetation and the soil surface from a mobile medium for killing and defoliating vegetation, and for killing or inhibiting the establishment of fungus, bacteria, virus, and insects, comprising, mixing a stream of hot water under pressure with a surfactant, heating a stream of compressed air to a temperature sufficient to melt the waxy cuticular coating of plants for killing such plants, mixing the heated stream of hot air with the mixed stream of hot water and surfactant to thereby form a hot air foam having a temperature within the range of 130° to 212° F. and consisting volumetrically of 80% to 95% hot air and 5% to 20% hot water and surfactant, and applying the hot air foam to vegetation and the surface of ground to kill and defoliate vegetation and to kill or inhibit the establishment of fungus, bacteria, virus and insects.

2. The method as defined in claim 1 wherein the stream of compressed air is heated to a temperature above the boiling point of water.

3. The method as defined in claim 1 wherein the mobile medium is selected from the group comprising a tractor, trailer, a pick-up truck, a self-propelled unit, or a hand-held application apparatus.

4. The method as defined in claim 2 wherein the stream of hot water and hot air foam have a temperature of approximately 212° F.

* * * * *